DIFFERENTIAL CAPSTAN ASSEMBLY
Filed May 11, 1959
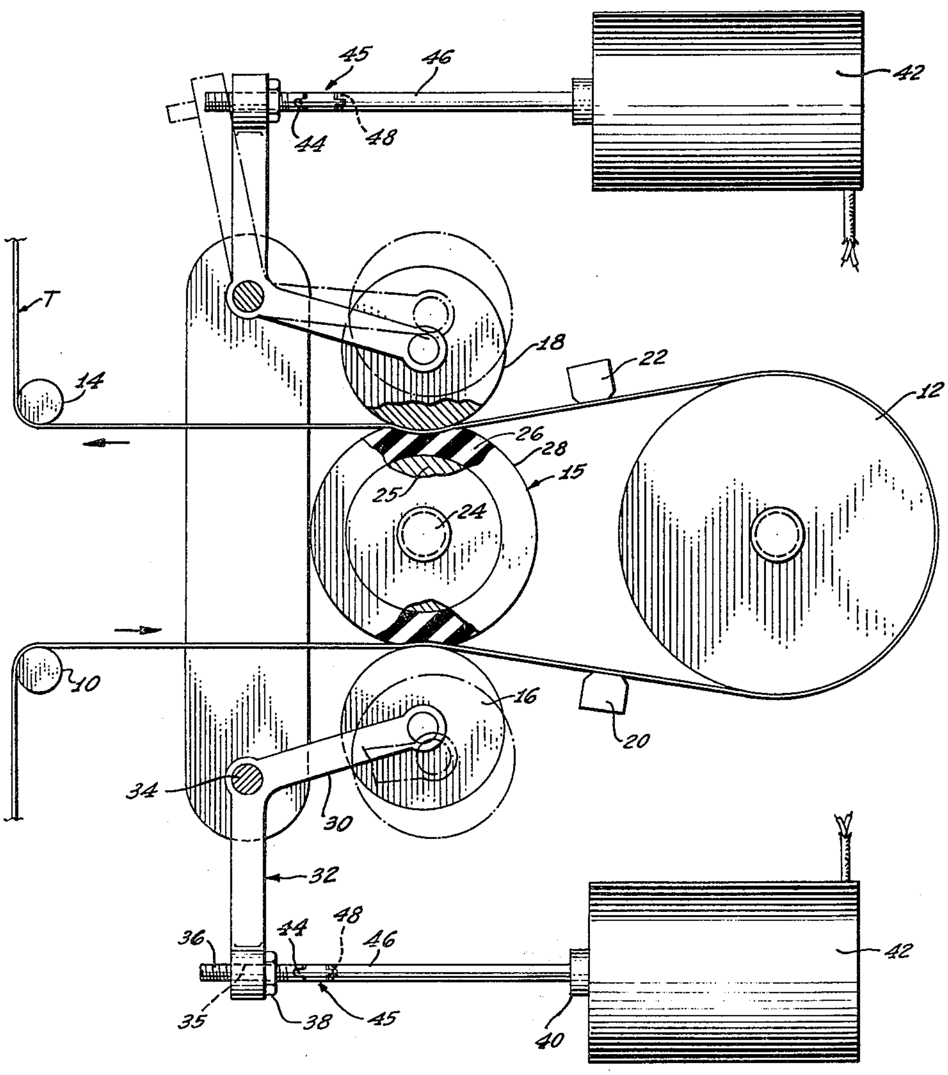
INVENTOR:
John T. Mullin
By Smyth & Roston
Attorneys United States Patent Office 3,093,284
Patented June 11, 1963

3,093,284

DIFFERENTIAL CAPSTAN ASSEMBLY

John T. Mullin, Beverly Hills, Calif., assignor to Minnesota Mining and Manufacturing Company, St. Paul, Minn., a corporation of Delaware
Filed May 11, 1959, Ser. No. 812,188
5 Claims. (Cl. 226—176)

This invention relates to a tape-transport mechanism for driving a tape with a portion of the tape under constant tension and traveling at a constant speed along an accurately controlled path. While the invention is widely applicable for its purpose to drive various kinds of ribbon-like members, it has been initially embodied in a mechanism for driving magnetic tapes for recording and reproducing television programs. This embodiment of the invention has been selected for the present disclosure and will provide adequate guidance for those skilled in the art who may have occasion to apply the same principles to other specific purposes.

A very large amount of information must be transmitted in each second of television recording and reproduction, and to keep the length of a television tape within practical limits, the information must be distributed not only longitudinally of the tape but also transversely of the tape. Even with such compact recording, high rates of travel are necessary. The problem is to provide precise control of the tape with the travel of the tape past a reproducing transducer exactly duplicating the previous travel of the tape past a recording transducer. Even the most minute fluctuations in the speed of the travel result in distortion of the signals by frequency modulation and the slightest departure of the tape from the predetermined path of travel causes serious signal distortion by phase displacement.

In a typical tape recording and reproducing system some type of driving mechanism receives the tape under appreciable tension from a pay-out reel, forms the tape into a loop to pass at least one transducing station under predetermined tension and then delivers the tape from the loop to a take-up reel which again places the delivered tape under appreciable tension. Since both of the reels place the tape under tension, irregularities in the travel of the loop of tape past a transducing station commonly originate in the two reels. The problem may be readily appreciated when it is considered that a fully loaded reel is both bulky and heavy and must rotate at a peripheral speed of many feet per second. Very high magnitudes of angular momentum of the two reels are unavoidable and with the greatest precautions, troublesome degrees of eccentricity of the wound tape are inevitable.

Other irregularities in the travel of the tape past a transducing station originate in the tape driving mechanism itself. To place the loop under tension, the ingoing tape must be driven at one speed and the outgoing tape at a slightly higher speed with consequent elongation of the tape that forms the loop. Any fluctuation in the degree to which the tape is elongated results in frequency modulation of the signal. In addition, it is exceedingly difficult to place a portion of the rapidly traveling tape under local tension without creating skewing forces with serious effects on the signals.

The present invention meets these various difficulties by driving both the ingoing tape and outgoing tape with rotary gripping pressure of high magnitude applied to a substantial area of the tape to isolate the tape loop completely from any irregularities originating in either of the two reels. This provision of substantial gripping pressure applied to substantial tape areas also eliminates any slippage at the two driving points. By further providing for the rotary gripping pressure to be uniformly distributed across the full width of the tape, the invention tensions the tape uniformly across its width to eliminate the usual skewing effects.

Broadly described, the invention accomplishes its purpose by utilizing the capacity for elastic flow of a non-compressible resilient rubber-like material. If a circumferentially moving body of such material of uniform radial cross section is restricted in radial cross section by laterally applied pressure at a point in its rotary travel, the material is locally accelerated by elastic flow through the restriction zone in a manner closely analogous to the acceleration of a liquid stream through a restriction.

The elastic body is under local pressure against the ingoing traveling tape and again against the outgoing traveling tape with pressure of such magnitude and with the pressure zone of such extent longitudinally of the tape as to completely block out effects originating in the two reels. The required differential drive to place the traveling loop of tape under predetermined tension is accomplished simply by creating a slightly higher rate of elastic flow of the elastomer at the outgoing end of the traveling loop.

In the preferred practice of the invention, utmost simplicity is achieved by using a single elastomer body at both ends of the loop. This single elastomer body is a circumferential portion of a drive capstan. A first nip-roller having a rigid periphery presses the ingoing part of the tape against the circumferential elastomer portion of the capstan for local reduction of the radial dimension thereof with consequent accelerated local elastic flow of the elastomer to drive the ingoing tape at a given rate of travel.

On the opposite side of the capstan, a second nip-roller also of non-yielding material presses the outgoing part of the tape against the circumferential elastomer portion of the capstan for greater local reduction of the radial dimension thereof with consequent greater accelerated local elastic flow of the rubber-like material to drive the outgoing tape at a higher rate of travel as required for the desired tensioning of the tape in the loop.

The features and advantages of the invention may be understood by reference to the following detailed description and the accompanying drawing.

The drawing, which is to be regarded as merely illustrative, shows a simplified diagrammatic plan view of a selected embodiment of the invention.

The drawing shows a traveling magnetic tape generally designated T which is unreeled from a conventional pay-out reel (not shown) and makes a 90° turn around a smooth polished guide post 10. The traveling tape makes a 180° turn around a reversing guide roller 12 and again makes a 90° turn around a second polished guide post 14 to be wound upon a conventional take-up reel (not shown).

The tape traveling between the first guide post 10 and the reversing guide roller 12 is pressed against one side of a drive capstan 15 by a nip-roller 16 and the tape returning from the reversing guide roller to the second guide post 14 is held under pressure against the other side of the drive capstan by a second nip-roller 18.

This arrangement forms a portion of the tape into a loop around the reversing guide roller 12 and places this loop portion under tension for recording or reproducing signals by suitable transducer means. The drawing shows a recording head 20 in contact with the ingoing leg of the loop and a reproducer or play-back head 22 in contact with the outgoing leg of the loop.

In accord with the teaching of the invention, the capstan 15, which is mounted on a power driven spindle 24, has a solid cylindrical core 25 of rigid material on which is mounted an annular or cylindrical body 26 of a suitable elastomer, this body forming a circumferential portion of the capstan having a circumferential surface 28. The cylindrical elastomer body 26 is of uniform radial cross section of at least the width of the tape T and may comprise any suitable rubber-like body which is incompressible but is resiliently deformable under moderate pressure.

The ingoing nip-roller 16 which may be made of metal presses the ingoing tape against the annular elastomer body 26 with sufficient force to insure that a substantial area of the tape is effectively frictionally engaged to prevent slippage. The required amount of pressure depresses the elastomer body 26 appreciably so that the nip-roller 16 in cooperation with the solid core 25 forms a restriction of less radial dimension than the unrestrained portion of the elastomer body and the elastomer body must contract in radial dimension to pass through the restriction. Since the elastomer is substantially incompressible and a constant volume passes each circumferential point in a unit of time, the elastomer material must pass through the radial restriction by elastic flow with local acceleration of the circumferential speed of the elastomer material. Because of the high coefficient of friction between the tape and the locally compressed elastomer material, the tape conforms with the peripheral speed of the elastomer material at the point of maximum restriction and maximum velocity.

In like manner, the outgoing metal nip-roller 18 presses the outgoing tape against the rotating elastomer body 26 on the other side of the capstan but exerts greater pressure than the ingoing nip-roller 16 and locally depresses the elastomer body to greater degree to cause the elastomer material to pass through a second restriction of lesser radial dimension than the first restriction. Because of the narrower restriction through which the elastomer must pass by elastic flow, the velocity of the elastomer at the restriction is greater than the velocity of the elastomer at the restriction on the ingoing side of the capstan. Consequently, the outgoing run of the tape loop is pulled by the capstan at a faster rate than the ingoing run with consequent tensioning and elongation of the tape in the loop.

In a typical practice of the invention, the outgoing run of the tape loop at the outgoing nip-roller 18 travels 0.02% faster than the ingoing run of the tape at the ingoing nip-roller 16. This velocity differential is obtained by positioning the outgoing nip-roller 18 at a radial distance from the capstan core 25 that is approximately 0.02% less than the radial distance of the ingoing nip-roller 16 from the capstan core.

Any suitable arrangement may be provided for mounting the nip-rollers 16 and 18 to cooperate with the capstan 15 in the described manner. Preferably an arrangement is employed which permits the nip-rollers to be retracted from the drive capstan whenever desired but does not require a new adjustment each time the nip-rollers are restored to their pressure-applying positions.

The arrangement employed in the initial practice of the invention is shown in the drawing. Each of the two nip-rollers 16 and 18 is journaled on a forked arm 30 of a bell crank 32 that is mounted on a pivot 34. The second arm of the bell crank 32 has a transverse threaded bore 35 at its outer end into which a screw 36 is adjustably threaded. A lock nut 38 is provided to maintain any selected adjustment of the screw in the threaded bore. Each of the screws 36 is connected by a universal joint to a corresponding armature 40 of a corresponding solenoid 42.

In the construction shown, each of the screws 36 is pivotally connected by a cross pin 44 with a universal joint link 45. The universal joint link 45 in turn is pivotally connected to a pull rod 46 by a second cross pin 48 that is perpendicular to the first cross pin 44. The pull rod 46 is rigidly connected to the corresponding armature 40 and in effect comprises an axial extension of the armature.

Since each of the armatures 40 is pulled to a given limit position whenever the corresponding solenoid is energized, it is apparent that with a given adjustment of the screw 36 relative to the bell crank 32, the corresponding nip-roller will exert the same pressure against the drive capstan 15 each time the solenoid is energized. Thus once the two screws 36 are adjusted for satisfactory operation with the tape driven differentially on opposite sides of the capstan, the two solenoids may be deenergized and energized repeatedly with no change in the degrees of pressure exerted by the two nip-rollers.

Since the two nip-rollers exert sufficient pressure to cause the traveling tape to conform to the two rates of elastic flow of the elastomer, the loop of tape around the reversing guide roller 12 is completely isolated from any effects on the tape that may be traced to the two reels. The annular elastomer body 26 and the solid core 25 on which it is mounted are accurately dimensioned with precise concentricity to cause the two runs of the tape to pass the drive capstan at constant speeds. The two nip-rollers are not only accurately dimensioned but are also precisely axially parallel with the drive capstan 16 to avoid any possibility of applying skew forces to the traveling tape.

My description in specific detail of the selected embodiment of the invention will suggest various changes, substitutions and other departures from my disclosure within the spirit and scope of the appended claims. For example, it will be appreciated that the term "tape" is intended to refer to any type of thin sheet having a ribbon-like configuration.

I claim:

1. In a tape transport mechanism, apparatus for developing and maintaining a predetermined longitudinal tension in the tape passing through a defined zone of the tape path, the said apparatus comprising in combination: a rotatably mounted elastomer body of circular configuration; first means disposed in cooperative relation with the peripheral surface of the body for holding the tape in frictional engagement with the body as the tape enters the zone; second means mounted in spaced angular relation with respect to the first means and in cooperative relation with the peripheral surface of the body for holding the tape in frictional engagement against the body as the tape leaves the zone; means coupled to the first means for pressing the first means toward the body with a first force to produce local deformation of the body and consequent elastomer flow and tape entrance velocity related to the first force; and means coupled to the second means for pressing the latter toward the body with a second force greater than the first force to produce local deformation of the body and consequent elastomer flow and tape exit velocity from the zone greater than the entry velocity of the tape, thereby developing and maintaining the predetermined tension.

2. In a tape-transport mechanism, the combination of: a drive capstan having a yielding circumferential portion at least as wide as the tape, said circumferential portion being made of elastically deformable material; means spaced from said capstan to reverse the direction of the travel of the tape and to form the traveling tape into a loop having an ingoing part in contact with said circumferential portion on one side of the capstan and an outgoing part in contact with said circumferential portion on the opposite side of the capstan; a first nip-roller pressing said ingoing part of the tape against said yielding circumferential portion of the capstan with a first force to permit tape to enter the loop at a given rate; and a second nip-roller pressing said outgoing part of the tape against said yielding circumferential portion of the capstan with a second force greater than the first force for local reduction of the radial dimension thereof and accelerated local elastic flow of the elastically deformable material to drive the outgoing tape at a rate of travel greater than the given rate, with consequent tensioning of the tape in said loop.

3. In a tape-transport mechanism, the combination of: a drive capstan having a yielding circumferential portion at least as wide as the tape, said circumferential portion being made of an effectively incompressible, elastically-deformable elastomer; means spaced from said capstan to reverse the direction of the travel of the tape and to form the traveling tape into a loop having an ingoing part in contact with said circumferential portion on one side of the capstan and an outgoing part in contact with said circumferential portion on the opposite side of the capstan; a first nip-roller disposed to press with a first force said ingoing part of the tape against said yielding circumferential portion of the capstan for local reduction of the radial dimension thereof with consequent accelerated local elastic flow of the elastomer to drive the ingoing tape at a given rate; a second nip-roller disposed to press with a second force greater than the first force said outgoing part of the tape against said yielding circumferential portion of the capstan for greater local reduction of the radial dimension thereof with greater accelerated local elastic flow of the elastomer to drive the outgoing tape at a higher rate of travel than the given rate with consequent tensioning of the tape in said loop; and means including two linkages operatively connected to said nip-rollers respectively, for moving said nip-rollers between a first disposition in pressed relation against the tape and a second retracted disposition to release the tape from pressure, each of said linkages having a further means for adjusting the respective first dispositions, to vary the pressure exerted by the corresponding nip-roller.

4. A combination as set forth in claim 3 wherein the means for moving comprises first and second solenoids operatively connected respectively to each of said two linkages to shift the nip-rollers, respectively, from the second disposition to the first disposition.

5. A combination as set forth in claim 3 in which each of said linkages includes: a bell crank; solenoid means to operate the bell crank; and means interconnecting the bell crank and the solenoid means, said interconnecting means being adjustable in length to vary the degree to which the corresponding nip-roller locally reduces the radial dimension of the circumferential portion of the capstan.

References Cited in the file of this patent

UNITED STATES PATENTS

| | | |
|---|---|---|
| 2,597,176 | Pettus | May 20, 1952 |
| 2,625,611 | Roberts | Jan. 13, 1953 |
| 2,668,674 | Roberts | Feb. 9, 1954 |
| 2,669,398 | Olson | Feb. 16, 1954 |
| 2,833,538 | Namenyi-Katz | May 6, 1958 |
| 2,909,337 | Lahti et al. | Oct. 20, 1959 |
| 2,945,692 | Maeder | July 19, 1960 |

FOREIGN PATENTS

| | | |
|---|---|---|
| 967,129 | France | Mar. 22, 1950 |